(12) United States Patent
Foresti

(10) Patent No.: US 10,444,987 B2
(45) Date of Patent: Oct. 15, 2019

(54) FACILITATING SELECTION OF HOLOGRAPHIC KEYBOARD KEYS

(71) Applicant: Microsoft Technology Licensing, LLC, Redmond, WA (US)

(72) Inventor: Adalberto Foresti, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 119 days.

(21) Appl. No.: 15/384,173

(22) Filed: Dec. 19, 2016

(65) Prior Publication Data

US 2018/0173417 A1     Jun. 21, 2018

(51) Int. Cl.
| | |
|---|---|
| G06F 3/0488 | (2013.01) |
| G06F 3/01 | (2006.01) |
| G06F 3/023 | (2006.01) |
| G02B 27/01 | (2006.01) |
| G02B 27/00 | (2006.01) |

(52) U.S. Cl.
CPC ....... *G06F 3/04886* (2013.01); *G02B 27/017* (2013.01); *G06F 3/013* (2013.01); *G06F 3/0237* (2013.01); *G02B 27/0093* (2013.01); *G02B 2027/0138* (2013.01); *G02B 2027/0141* (2013.01); *G02B 2027/0178* (2013.01); *G02B 2027/0187* (2013.01)

(58) Field of Classification Search
CPC .............. G06F 3/0237; G06F 3/0488–3/04897
See application file for complete search history.

(56) References Cited

U.S. PATENT DOCUMENTS 4,394,649 A * 7/1983 Suchoff et al. ......... G06F 3/023
                                                                345/168
5,963,671 A   10/1999 Comerford et al.
(Continued)

FOREIGN PATENT DOCUMENTS

| CA | 2820997 A1 | 1/2014 |
|---|---|---|
| EP | 2109046 A1 | 10/2009 |

(Continued)

OTHER PUBLICATIONS

Raynal, "Semantic Keyboard: Fast Movements Between Keys of a Soft Keyboard", In Proceedings of the 14th International Conference on Computers Helping People with Special Needs, Jul. 9, 2014, pp. 195-202.

(Continued)

*Primary Examiner* — Gene W Lee
(74) *Attorney, Agent, or Firm* — Alleman Hall Creasman & Tuttle LLP

(57) ABSTRACT

A computing device includes a display configured to visually present a holographic cursor and a holographic keyboard including a plurality of holographic keys. The computing device also includes an input interface configured to receive, from an input device, user input controlling the holographic cursor. Input predictor logic is configured to, based at least on one or more immediately prior selections of holographic keys, predict a subset of holographic keys most likely to be selected next. One or both of an appearance of the holographic keyboard and a parameter of movement of the holographic cursor is adjusted to facilitate selection of a holographic key in the predicted subset of holographic keys.

18 Claims, 12 Drawing Sheets

(56) References Cited

U.S. PATENT DOCUMENTS

| | | | |
|---|---|---|---|
| 5,982,351 A * | 11/1999 | White et al. | G06F 3/023 715/810 |
| 7,098,896 B2 | 8/2006 | Kushler et al. | |
| 8,018,441 B2 | 9/2011 | Shin et al. | |
| 8,059,101 B2 | 11/2011 | Westerman et al. | |
| 2005/0169527 A1* | 8/2005 | Longe et al. | G06F 3/0237 382/177 |
| 2009/0088217 A1* | 4/2009 | Chung et al. | H04M 1/00 455/566 |
| 2011/0074704 A1 | 3/2011 | Causey et al. | |
| 2011/0231796 A1* | 9/2011 | Vigil | G06F 3/04883 715/810 |
| 2012/0062465 A1 | 3/2012 | Spetalnick | |
| 2013/0100031 A1 | 4/2013 | Longe et al. | |
| 2013/0233627 A1* | 9/2013 | Vidal | G01G 19/414 177/25.13 |
| 2014/0198048 A1 | 7/2014 | Unruh et al. | |
| 2015/0095238 A1* | 4/2015 | Khan | G06Q 20/325 705/71 |
| 2015/0254905 A1* | 9/2015 | Ramsby et al. | G06T 19/00 345/419 |
| 2016/0018985 A1 | 1/2016 | Bennet et al. | |
| 2017/0052702 A1* | 2/2017 | Norris, III | G06F 3/0488 |
| 2017/0060413 A1* | 3/2017 | Singh | G06F 3/0237 |
| 2017/0293402 A1* | 10/2017 | Morris | G06F 3/0482 |

FOREIGN PATENT DOCUMENTS

| | | |
|---|---|---|
| EP | 2669782 A1 | 12/2013 |
| WO | 2011113057 A1 | 9/2011 |
| WO | 2015127325 A1 | 8/2015 |

OTHER PUBLICATIONS

"Windows 10 and 8.1 Touch Keyboard Resize and Modify—Solution for Tablets", Published on: Aug. 23, 2015 Available at: https://www.youtube.com/watch?v=69GTSxS5Kik.

Costagliola, et al., "Performances of Multiple-Selection Enabled Menus in Soft Keyboards", In Proceedings of 15th International Conference on Distributed Multimedia Systems, vol. 9, Sep. 10, 2009, pp. 1-6.

"Adaptxt—Free Keyboard APK", Retrieved on: Aug. 25, 2016 Available at: http://www.apkask.com/android/adaptxt-free-keyboard-v3-2-apk.html.

"International Search Report and Written Opinion Issued in PCT Application No. PCT/US2017/065931", dated Feb. 12, 2018, 10 pages.

* cited by examiner

US 10,444,987 B2

FACILITATING SELECTION OF HOLOGRAPHIC KEYBOARD KEYS

BACKGROUND

Computing devices that support text input may not be equipped with a physical keyboard. Such devices may provide support for a "soft" or "virtual" keyboard. Input may be provided to the keyboard via direct touch input or indirectly via an input device controlling a cursor displayed over the keyboard.

SUMMARY

Examples are disclosed for adjusting a holographic keyboard to facilitate selection of keys of the holographic keyboard. One example computing device for performing the adjustment includes a display configured to visually present a holographic cursor and a holographic keyboard including a plurality of holographic keys, an input interface configured to receive, from an input device, user input controlling the holographic cursor, and input predictor logic configured to, based at least on one or more immediately prior selections of holographic keys, predict a subset of holographic keys most likely to be selected next, and adjust one or both of an appearance of the holographic keyboard and a parameter of movement of the holographic cursor to facilitate selection of a holographic key in the predicted subset of holographic keys.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A "soft" or "virtual" keyboard may be provided by presenting a graphic representation of a keyboard on a display, such as a holographic keyboard. Such a holographic keyboard may be operated via touch directly on the display, or via indirect control of a cursor using a pointing device (e.g., a mouse, a joystick or other controller, a peripheral touch pad, an eye tracker, etc.). A holographic keyboard that operates via direct touch input may mimic the user experience of operating a more traditional, hardware-based physical keyboard. However, some holographic keyboards may be displayed by a device that does not allow touch input directly on the displayed keys.

A holographic keyboard that operates via indirect input from an input device (e.g., a pointing device that controls a cursor) may provide a different user experience. For example, a cursor may be used to select different keys of the keyboard. The present disclosure provides for facilitating the selection of a holographic key and/or a word in order to increase the efficiency of providing input to an associated holographic keyboard. For example, the disclosure provides for adapting the shape and orientation of the keyboard based on contextual information (e.g., fine details of input motion, past inputs, applications running, etc.). The disclosure also provides for adapting the movement of a displayed cursor based on the contextual information. For example, for a given input motion, movement of the cursor may be slowed, stopped, or redirected based on proximity to a holographic key predicted to be selected as a next input (e.g., based on the contextual information). Additional mechanisms for facilitating holographic keyboard input are described below, including recognizing gestures and presenting word clouds of words predicted to be input.

Figure 1A:
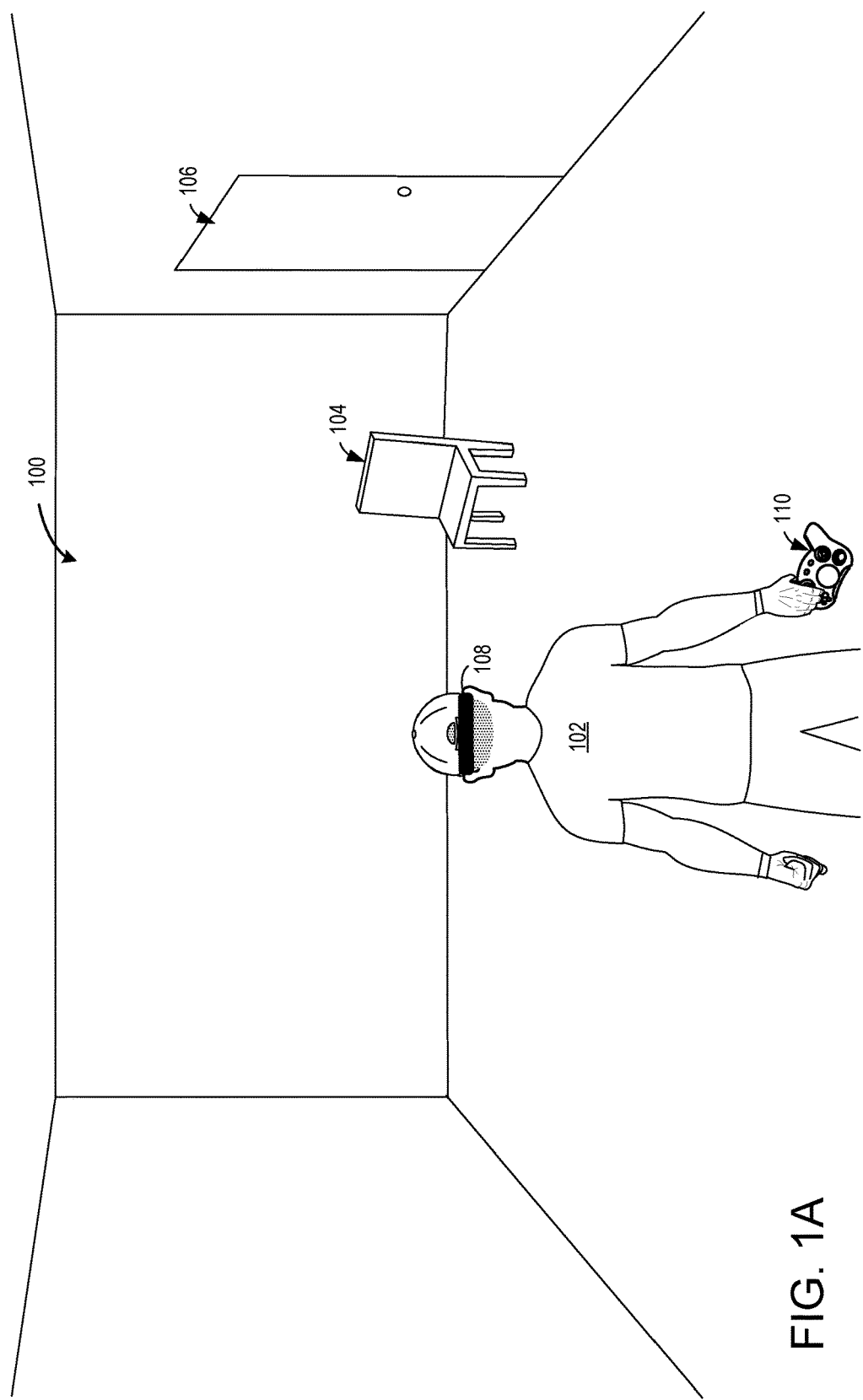
FIG. 1A shows an example real-world environment including a user of a head-mounted display device.

FIG. 1A shows an example physical environment 100 including a user 102 and one or more real-world objects, such as chair 104 and door 106. The user 102 is illustrated wearing a head-mounted display (HMD) device 108 and holding a controller 110. The HMD device 108 may include a see-through near-eye display configured to present images as augmentations to the real-world environment (e.g., physical environment 100). For example, a virtual object, such as a holographic keyboard, may be displayed via the HMD device 108 as an overlay and/or integrated with the real-world environment as viewed through the HMD device. While FIG. 1A illustrates the user 102 using an HMD device, the methods and systems described herein may also include and/or be performed by another computing device, such as a mobile computing device (e.g., smartphone, tablet, etc.) or desktop computing device. With such devices, the holographic keyboards described herein may be displayed as an augmentation of a real-world environment (e.g., as imaged by a camera coupled to the computing device) and/or within a virtual environment (e.g., as a window of a virtual user interface displayed on an associated display).

The user 102 is illustrated as holding a controller 110. In FIG. 1A, the controller 110 is illustrated as a game controller. In other examples, the controller 110 may include any suitable input device for controlling a holographic cursor (e.g., displayed in association with a holographic keyboard). For example, controller 110 may include a peripheral handheld controller (e.g., a mouse, a game controller, a joystick, a trackball, etc.), a touch-sensitive device (e.g., a touch display or a touchpad of a mobile computing device), an eye tracker (e.g., an eye tracking imaging device, which may be integrated in the HMD device 108 in the illustrated example), and/or any suitable input device for receiving user input and generating an output signal indicating movement for controlling a displayed position of a holographic cursor.

Figure 1B:
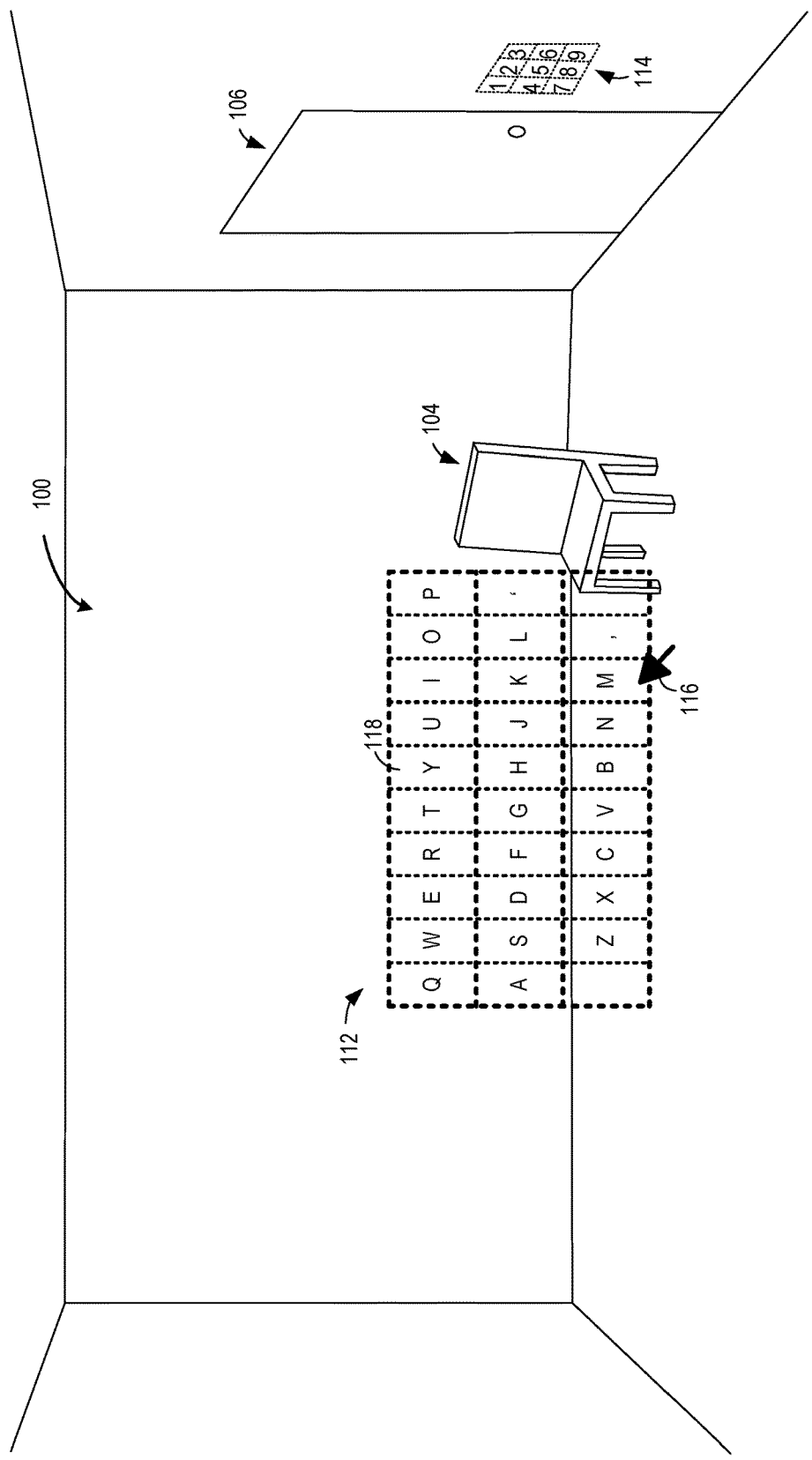
FIG. 1B shows an example view of the real-world environment of FIG. 1A through the head-mounted display device, the real-world environment being augmented by the display of example holographic keyboards.

FIG. 1B shows an example view of environment 100 through a see-through near-eye display of HMD device 108 of FIG. 1A. The view of environment 100 illustrated in FIG. 1B includes the real-world objects including the chair 104 and the door 106, and also includes virtual objects, such as holographic keyboards 112 and 114 and holographic cursor 116 that are displayed by the HMD device 108. Holographic keyboard 112 represents a body locked keyboard, in which the position of the keyboard is maintained relative to the user and/or the user's field of view. In other words, as a user moves around the environment 100 and/or turns his/her head, the holographic keyboard 112 may stay in the same region of the user's field of view and may change positions/orientations relative to the real-world objects in the environment. For example, if a user turns his/her head to the left, the holographic keyboard 112 may move with the user's head to be displayed further to the left of the chair 104.

Holographic keyboard 114 represents a world locked keyboard, in which the position of the keyboard is maintained relative to a real-world object—in this case, door 106 and the adjacent wall. In other words, as a user moves around the environment 100 and/or turns his/her head, the holographic keyboard 114 may stay in the same position relative to the door 106 (e.g., to the right of the door) and may change positions/orientations relative to the user. For example, if the user walks forward, the holographic keyboard 114 may stay in the same position relative to the door 106 but may shift into the periphery of the user's field of view.

The holographic keyboards 112 and 114 are illustrated in FIG. 1B to show different positioning schemes for virtual objects (e.g., world locked versus body locked).

Each holographic keyboard may have a plurality of selectable holographic keys, such as holographic key 118, which corresponds to the letter "Y" in the illustrated example. Keys of the holographic keyboard may be selected by manipulating an input device (e.g., controller 110 of FIG. 1A) to cause movement of the holographic cursor 116 and to perform a selection input (e.g., pressing a button, dwelling in a particular location for a threshold period of time, giving a voice instruction, etc.) while the cursor is positioned over a key.

Figure 2:
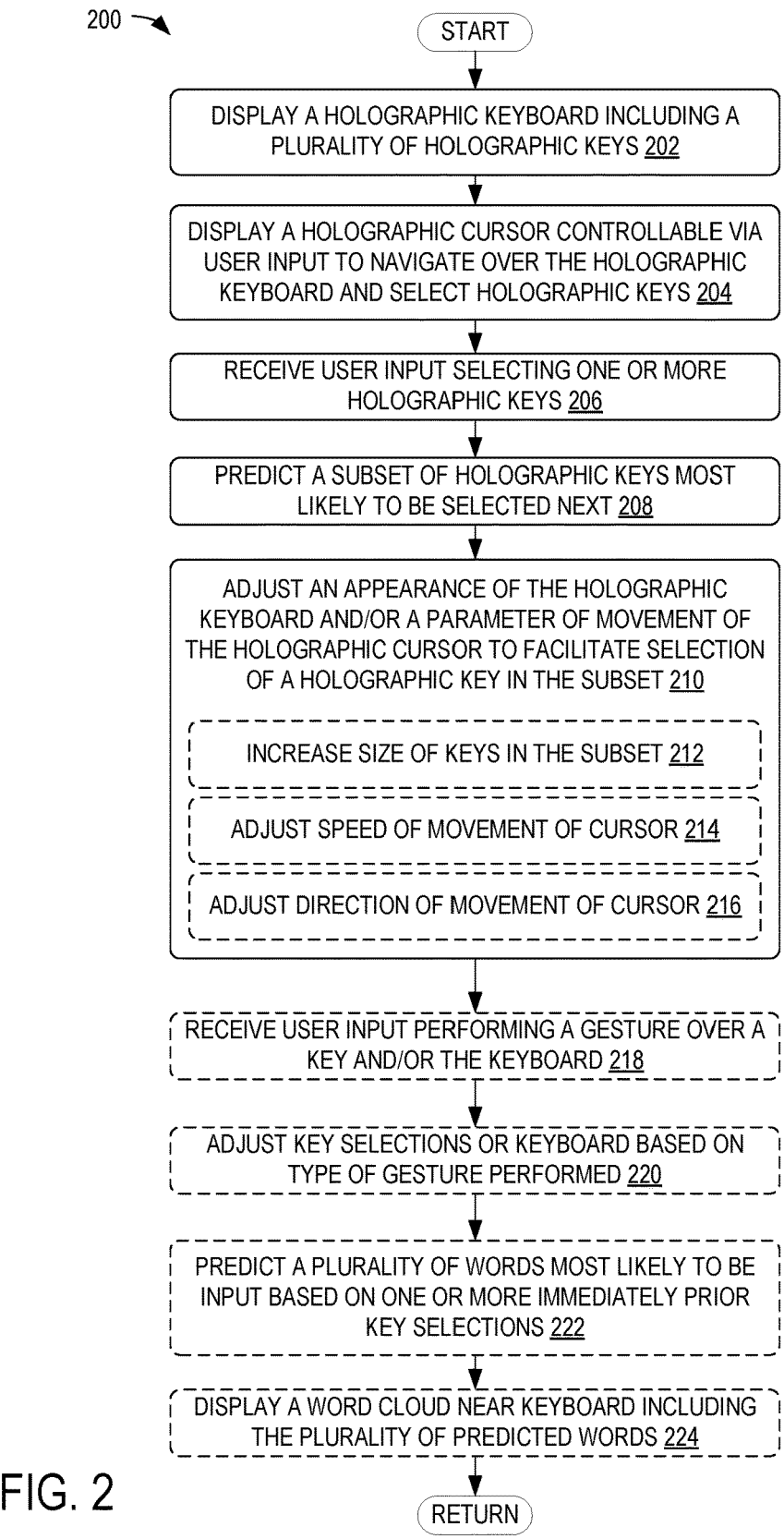
FIG. 2 shows a flow chart of an example method of facilitating selection of holographic keys of a holographic keyboard.

As shown, the cursor 116 is positioned at the bottom right of the holographic keyboard 112, near the letter "M." In order to select the letter "E," the cursor would be moved across almost the entire length and height of the keyboard. Inputting a word such as "Memento" may involve many such "cross-keyboard" movements, resulting in a slow and arduous process to input a single word. The methods and systems described herein facilitate the selection of keys on a holographic keyboard by using contextual information, such as prior inputs, currently executing applications, environmental information, etc., to determine a subset of keys that are most likely to be selected next. For example, a selection of the letters "M" then "E" then "M" may narrow down likely next letter inputs to those that are associated with the fourth letter of words that start with "MEM." In order to facilitate selection of these likely next letters, an operation and/or appearance of the holographic keyboard may be adjusted. For example, the likely next letters may be highlighted by increasing the size of the associated keys, or the movement of the cursor may be affected while in a region of the associated keys. FIG. 2 illustrates a method of performing such adjustments.

FIG. 2 is a flow chart of a method 200 for adjusting a holographic keyboard in order to facilitate selection of keys of the keyboard (e.g., keys that are most likely to be input next). Method 200 may be performed by any suitable computing device, including the HMD device 108 in some examples. In other examples, method 200 may be performed across multiple devices. For example, some data may be sent from a display device (and/or local computing device) to a remote computing device (e.g., a networked server device) to offload processing to the remote computing device. The remote computing device may send back (to the display device and/or local computing device) data used to control the operation of the display device (and/or local computing device).

At 202, method 200 includes displaying a holographic keyboard including a plurality of holographic keys. Holographic keyboards 112 and 114 of FIG. 1B are examples of holographic keyboards that may be displayed at 202. Additional examples will be described below with respect to FIGS. 3-8. At 204, the method includes displaying a holographic cursor that is controllable via user input to navigate over the holographic keyboard and select one or more holographic keys. Controller 110 of FIG. 1A is an example input device that may control navigation of the holographic cursor over the holographic keyboard. In some examples, movement of, or other input to, a mechanical element (e.g., a joystick, trackball, directional pad, etc.) of an input device may control the cursor to move in a direction indicated by the input. In other examples, eye, finger, hand, or other gestures detected by an input device (e.g., an eye tracking camera, a hand or body tracking camera, an inertial measurement unit, a touchpad, etc.) may control the cursor to move in a direction indicated by the input. In other examples, a touch display of a mobile computing device may be used to remotely control a cursor virtually displayed via an HMD device. In any of the above examples, the cursor may, by default, move according to a predefined acceleration profile. For example, the cursor may move at a steady speed in a selected direction based on any cursor movement input. In other examples, the cursor may increase in speed according to a predefined acceleration curve or other function based on a duration of a cursor movement input. In such examples, the speed of movement may be reset upon receiving input that changes a direction of movement of the cursor.

In additional or alternative examples, the speed of cursor movement may be a function of the speed of movement applied to the input device. Gesture or other input may include movement of an associated input element (e.g., an eye, finger, hand, pointer device, etc.) in a direction corresponding to a requested movement of the cursor. For example, to move the cursor left, a user may move his/her eyes, a pointer device, or another input mechanism along a trajectory to the left of the user. The speed at which this input motion occurs may be input into a predetermined function to calculate a speed at which the cursor moves. The movement of the input device (or element detected by the input device) in the real-world may have a 1:1 correlation with movement of the cursor relative to the user in some examples. In other examples, other correlations may be used (e.g., x:y, where x is greater than or less than y). The correlation between movement of the input device and/or element detected by the input device in the real world and movement of the cursor in the display environment may be dynamically altered based on contextual factors, such as a speed or acceleration of the input device and/or element. As discussed above, this dynamic alteration may be made according to a predefined default acceleration profile in some examples. However, as will be described below, the acceleration profile may be altered to facilitate selection of holographic keys.

At 206, the method includes receiving user input selecting one or more holographic keys. For example, as described above, the user may provide input to move the cursor relative to the holographic keyboard. Once the cursor is positioned over a holographic key, the user may select that holographic key via a predetermined selection input (e.g., pressing a button on a pointer device or handheld controller, adjusting a pressure of input to a touchpad, performing a selection gesture, dwelling on the holographic key by ceasing cursor input movement for a threshold period of time, etc.). In some examples, an indication of which holographic keys have been selected may be displayed proximate to the holographic keyboard in order to allow a user to track inputs. For example, while typing the word "MEMENTO," each input letter ("M," "E," "M," etc.) may be displayed near the holographic keyboard so that the user is able to keep track of which letters have been input. In additional or alternative examples, selection inputs are stored as a list of elements corresponding to selected holographic keys. For example, based at least on selection of one or more alphanumeric keys of an alphanumeric keyboard, letters or numbers associated with selected keys may be stored in an order corresponding to the order in which the associated keys were selected.

At 208, the method includes predicting a subset of holographic keys most likely to be selected next. For example, a computing device, such as HMD device 108 of FIG. 1A, a desktop computing device, a remote server, etc. may include one or more logic engines for providing input prediction logic based on contextual information. As examples, a logic engine may include one or more processors executing software logic, firmware programmed with logic, and/or hardware such as application specific integrated circuits programmed with logic. The contextual information may include parameters of input motion, past inputs (e.g., stored selection inputs, as described above), applications running, a user profile associated with a current user, and/or any other suitable information for determining a context of the user and/or associated computing device. The contextual information may be processed by the logic engines implementing any suitable computer analysis, including supervised and unsupervised machine learning algorithms and/or techniques.

Example machine-learning algorithms and/or techniques include, but are not limited to, exploratory factor analysis, multiple correlation analysis, support vector machine, random forest, gradient boosting, decision trees, boosted decision trees, generalized linear models, partial least square classification or regression, branch-and-bound algorithms, neural network models, deep neural networks, convolutional deep neural networks, deep belief networks, and recurrent neural networks. Such machine-learning algorithms and/or techniques may, for example, be trained to determine a likelihood of each holographic key being a next input.

The machine-learning algorithms and/or techniques may additionally or alternatively be trained to determine precursor information used by downstream logic to make further determinations. For example, upstream machine learning logic may be used to determine a context of the user, and downstream machine learning logic may consider the determined context, along with other inputs, in determining a likelihood of the user selecting a given holographic key next. For example, a first device (e.g., a desktop computer) may store information regarding a user interaction with the first device (e.g., past inputs), and use this information to predict words that a user attempts to input. A second device (e.g., a mobile computing device) may store or otherwise monitor additional information, such as a current location and direction of the user, in addition to prior user interaction with the device and prior location information for the user. Accordingly, the second device may also use this additional information to predict words that a user attempts to input. A third device (e.g., a holographic display device or other device for presenting augmented reality images) may store or otherwise have access to information from the first and/or second device and/or still further information, such as a video stream captured by one or more cameras. The third device may recognize objects in the video stream that may be relevant to the text entry process, and use such information to predict words that a user attempts to input.

As an illustrative, non-limiting example, a user may be attempting to assemble a furniture item (in this example, a dresser) while wearing a head-mounted display (HMD) device. The HMD device may recognize the objects in front of the user as parts of the furniture item being assembled, integrate this information with a recent purchase history or browsing history of the user (and/or a recent location of the user that ties the user to a furniture store) to identify the furniture item (e.g., the type of furniture item, manufacturer, model, or other feature of the furniture item. Upon detecting that the user has entered the letters "D" and "R," the HMD device may offer "DRESSER [identifier] ASSEMBLY INSTRUCTIONS" as an auto-complete option (e.g., where the [identifier] is replaced with a determined identifier of the dresser).

Using the above non-limiting example, if the user is wearing the HMD during a different context, such as while looking at a magnet on a refrigerator that includes the name of the user's family physician, the auto-complete option provided responsive to the input of the letters "D" and "R" may be different, such as "DR. [name] OFFICE HOURS" (e.g., where [name] is replaced with a determined name of the doctor, as provided in the magnet or identified in other user context information).

It is to be understood that any of the computer-implemented determinations described herein may leverage any suitable machine-learning approach, or any other computer-executed process for converting known types of input (e.g., cursor movement input, holographic key selection input, computing device state input, etc.) into holographic key selection prediction determinations.

As an illustrative example, using an alphabetic holographic keyboard, a user may select holographic keys of the keyboard to form a word. Building on the example described above with respect to FIG. 1B, a user may select keys associated with the letters "M," "E," and "M" while attempting to input the word "Memento." After receiving the selection of each letter (or after receiving selection of a threshold number of letters) of a word to be input, the above-described input prediction logic may determine a likelihood of selecting each key of the holographic keyboard. In this manner, the input prediction logic may determine a subset of the keys most likely to be selected next (e.g., a top one, two, three, or other threshold number of keys most likely to be selected, a number of keys above a threshold of likeliness to be selected next, etc.). Such prediction may be determined based on computer analysis of the past inputs and the contextual information using one or more of the machine-learning algorithms described above or any other suitable approach. The subset of holographic keys most likely to be selected next may be based at least on one or more immediately prior selections of holographic keys (e.g., the selection of the keys associated with the letters "MEM" in the above example). For example, letters associated with keys of the keyboard may be ranked relative to one another based on a language model, which may consider a number of words (starting with "MEM") including that letter as the fourth letter, frequency of use of such words, relevancy of such words to a current context of the device, etc. A threshold number of top letters (e.g., a top letter, a top two letters, a top three letters, etc.) may be determined to be most likely to be selected next. In some examples, the prediction may be performed by a remote computing device or separate module of a computing device and received by input prediction logic to be used in later determinations (e.g., one or more of the remaining steps of method 200).

At 210, the method includes adjusting an appearance of the holographic keyboard and/or a parameter of movement of the holographic cursor to facilitate selection of a holographic key in the subset determined at 208. The selection of holographic keys in the subset may be facilitated by adjusting the keyboard and/or cursor movement to bias toward keys of the subset and/or to bias away from keys that are not in the subset. In one example, the selection of the holographic key is facilitated by increasing a size of one or more of the holographic keys in the predicted subset of holographic keys, as indicated at 212.

Figure 3:
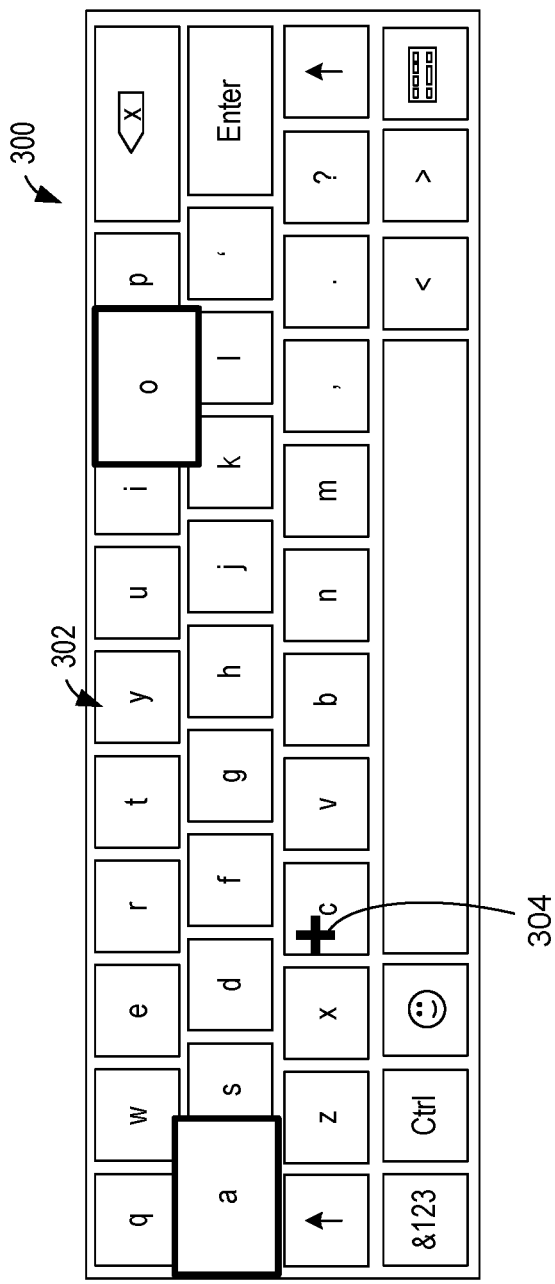
FIG. 3 shows an example holographic keyboard adjusted to facilitate selection of holographic keys by increasing the size of keys predicted to be selected next.

Turning briefly to FIG. 3, an example of increasing the size of keys of the subset of holographic keys is illustrated. FIG. 3 shows a holographic keyboard 300 including a plurality of holographic keys 302 (in this example, largely comprising alphabetic keys). The "+" marker 304 may indicate an immediately prior input made to the keyboard to select the holographic key associated with the letter "c." Based on selection of that key (and/or based on other contextual information, as described above), input predictor logic may predict that the letters "o" and "a" are most likely to be selected next. For example, the letters "o" and "a" may have a highest likelihood of being selected next based on the performance of the machine-learning algorithms or other computer analysis described above. Accordingly, the keys associated with the letters "o" and "a" may form the above-described subset of holographic keys most likely to be selected next. Thus, these keys may be displayed larger than those keys are typically displayed (and those keys may be given a larger than normal "hit box" in which the cursor may be located to provide input selecting the associated key) In other words, each key of the subset of keys most likely to be selected next may be increased in size. In some examples, each of the keys in the subset may be increased to the same size. In other examples, each key in the subset may be sized according to an associated likelihood of that key being selected next (e.g., where size increases with likelihood of being selected next).

In order to accommodate the increased size of the keys associated with letters "a" and "o," other keys surrounding the "a" and "o" keys may be adjusted in size and/or hit box. By only adjusting the surrounding keys, the overall size and layout of the keyboard may be maintained, as many keys may be unaffected by the size adjustment. In other examples, the increase in size of the subset of keys may be accommodated by shifting and/or resizing each other key (or each other key of the same type) in the keyboard.

In some examples, keys that are more likely to be hit based on the statistical likelihood figures derived by a language model (e.g., via the input prediction logic) may be dilated on the holographic keyboard by increasing the key area with a "fishbowl effect" in order to simplify targeting. An example formula for the area of each key may include:

$$A1 = A0\,(1+p),$$

where A0 is the default size of the key, A1 is the new size, and p is the computed likelihood of the key to be targeted for selection (e.g., according to the input prediction logic as described above). More refined variants may introduce a minimum threshold for size changes. Another example formula includes:

$$A1 = A0,\ \text{if}\ (p<k),\ \text{and}$$

$$A1 = A0\,(1+p),\ \text{if}\ (p \geq k),$$

where the size is not increased if the probability is below a given threshold k. Likewise, some other embodiments may further introduce a size ceiling as well that is assigned as p exceeds some other threshold "h."

The size dilation may be rendered graphically in different ways depending on the implementation. In some embodiments, the keys may retain shape and displace smaller keys that no longer fit on the same row. In other embodiments, the keys dilate without retaining a respective shape. Instead, the keys keep a relative position compared to the other keys, but adjust the shape so that no blank space is created between the keys. The algorithm responsible for the rendering of the keyboard may generate suitable dividing lines between the keys e.g., by using spline formulas. Some embodiments may support both approaches.

Returning to FIG. 2, in additional or alternative examples, the selection of the holographic key is facilitated by adjusting a speed of movement of the holographic cursor based at least on the user input, as indicated at 214. For example, the speed of movement of the cursor may be adjusted based at least on a distance of the holographic cursor from one of the holographic keys in the predicted subset of holographic keys. In some examples, the movement of the holographic cursor may be stopped on a particular key in the predicted subset for a threshold period of time based at least on the user input causing the cursor to move to a location that is within a threshold distance of that particular key.

Figure 4:
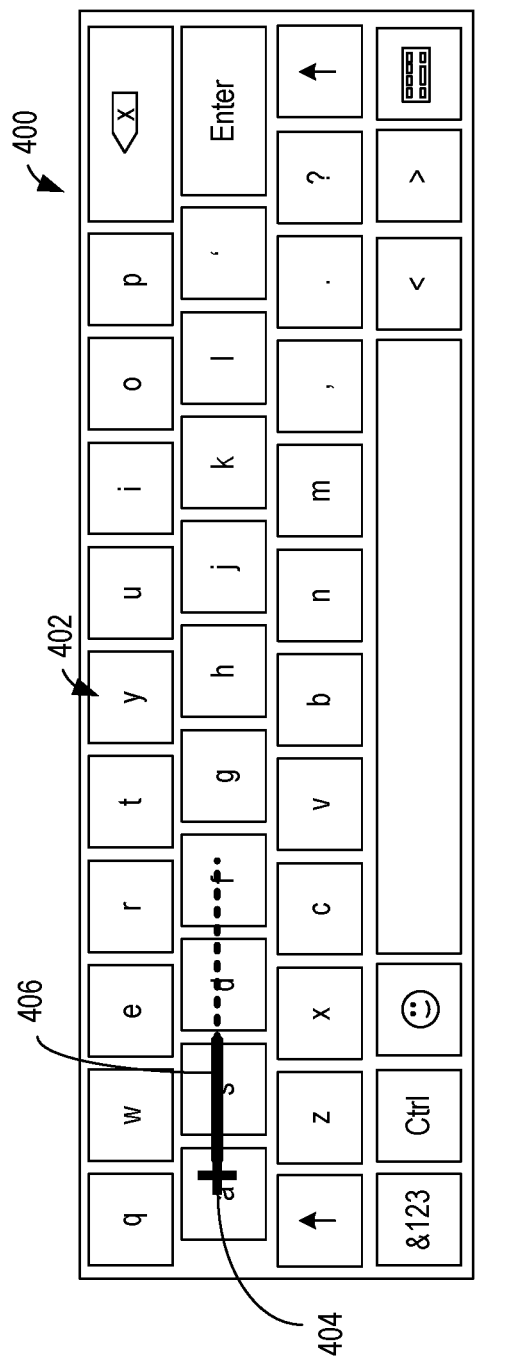
FIG. 4 shows an example holographic keyboard adjusted to facilitate selection of holographic keys by adjusting a speed of movement of a cursor based at least on a proximity of the cursor to a key that is predicted to be selected next.

Turning briefly to FIG. 4, an example of adjusting a speed of movement of a cursor over a holographic keyboard is illustrated. FIG. 4 shows a holographic keyboard 400 including a plurality of holographic keys 402. The "+" marker 404 may indicate an immediately prior input made to the keyboard to select the holographic key associated with the letter "a." As indicated by the trajectory 406, the user may begin moving the cursor to the right. Based on a selection of the "a" key (and/or based on other contextual information, as described above), input predictor logic may predict that the letter "d" is one of the most likely letters to be selected next. For example, the letter "d" may have a highest likelihood of being selected next based on the performance of the machine-learning algorithms or other computer analysis described above. Accordingly, the key associated with the letter "d" may form or be included in the above-described subset of holographic keys most likely to be selected next. In order to facilitate selection of the key associated with the letter "d," the movement of the cursor may slow down or stop upon entering the boundary of the key associated with the letter "d," as illustrated by the dashed line portion of the trajectory 406. In the illustrated example, the solid line portion of the trajectory may represent movement of the cursor according to a default speed and/or acceleration profile. The dashed line portion of the trajectory may represent movement of the cursor that is slowed for sticky traversal over a holographic key included in a subset of keys most likely to be selected next. In some examples, the slow movement of the cursor may continue even after the cursor passes a key within the subset (e.g., the key associated with the letter "d" in the illustrated example), as illustrated in FIG. 4, to allow for course corrections (e.g., to prevent the cursor from moving away from the letter "d" too quickly).

Accordingly, the displayed pointer's speed of traversal of a certain key, while en route to the current destination of the holographic cursor controlled by the user, may be either accelerated or slowed down depending on the computed likelihood that a user intends to select that key. By slowing down the trajectory of the displayed cursor, the system gives an opportunity to the user to "bring back" the cursor in case the intended key was overshot with an unnecessarily wide/fast motion.

Returning to FIG. 2, the selection of the holographic key additionally or alternatively may be facilitated by adjusting a direction of movement of the holographic cursor based at least on the user input, as indicated at 216. For example, a direction of movement of the cursor may be adjusted based at least on a distance of the holographic cursor from one of the holographic keys in the predicted subset of holographic keys.

Figure 5:
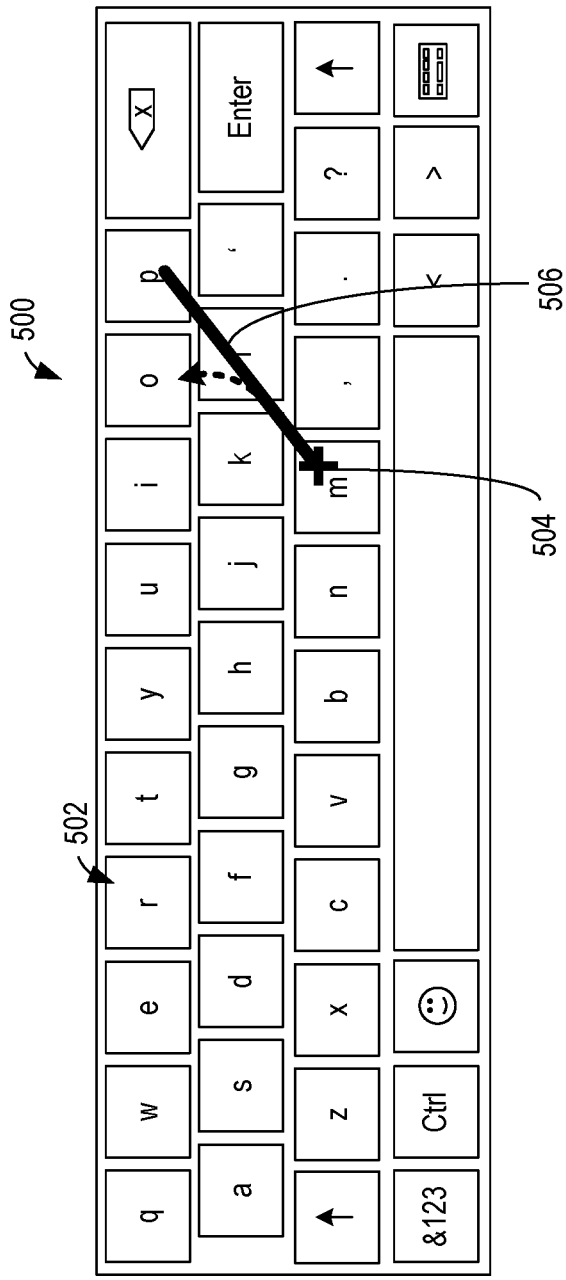
FIG. 5 shows an example holographic keyboard adjusted to facilitate selection of holographic keys by adjusting a direction of movement of a cursor based at least on a proximity of the cursor to a key that is predicted to be selected next.

Turning briefly to FIG. 5, an example of adjusting a direction (and, optionally, a speed) of movement of a cursor over a holographic keyboard is illustrated. FIG. 5 shows a holographic keyboard 500 including a plurality of holographic keys 502. The "+" marker 504 may indicate an immediately prior input made to the keyboard to select the holographic key associated with the letter "m." As indicated by the trajectory 506, the user may begin moving the cursor to the upper right. Based on a selection of the "m" key (and/or based on other contextual information, as described above), input predictor logic may predict that the letter "o" is one of the most likely letters to be selected next. For example, the letter "o" may have a highest likelihood of being selected next based on the performance of the machine-learning algorithms or other computer analysis described above. Accordingly, the key associated with the letter "o" may form or be included in the above-described subset of holographic keys most likely to be selected next. In order to facilitate selection of the key associated with the letter "o," the movement of the cursor may be drawn toward the key associated with the letter "o," and optionally slow down or stop, upon nearing (e.g., coming within a threshold distance of) the boundary of the key associated with the letter "o," as illustrated by the dashed line portion of the trajectory 506. In the illustrated example, the solid line portion of the trajectory may represent requested movement of the cursor according to a default speed and/or acceleration profile based on the user input. The dashed line portion of the trajectory may represent movement of the cursor that is slowed and redirected based on a gravity pull toward a holographic key included in a subset of keys most likely to be selected next. Accordingly, even though the movement of the input device is directed toward the key associated with the letter "p," the course of the cursor may be altered to move the cursor closer to the key associated with the letter "o," simulating a gravitational pull of the key associated with the letter "o."

In some examples, the cursor trajectory may be modelled using Newton's gravitational formula:

$$F = G((M1 Mi)/R^2),$$

where, in this context, M1 is an assigned "mass" of the cursor, and Mi is the "mass" of the i-th holographic key, which may be proportional to the computed likelihood of the associated symbol to be selected next (e.g., using the computer analysis performed by the input prediction logic described above). The trajectory of the cursor (V) may be a linear combination of the vectors representing the gravitational pull of each key ($\Sigma$ Fi), plus the vector corresponding to the relative commanded movement of the holographic cursor based on user input (Pphysical−Pdisplayed), as represented by:

$$V = f((P\text{physical} - P\text{displayed}), \Sigma Fi)$$

In the above representation, V is a speed (e.g., in m/s), P (or delta P, the change in physical position minus displayed position) is a position (e.g., in meters), and F is a force (e.g., in Newtons or kg*m/s$^2$). A normalized representation of the above equation may be determined by calculating Pnext (e.g., a next location of the cursor when the frame of the holographic screen displaying the cursor is refreshed). Such a normalized representation may be expressed by:

$$P\text{next} = P\text{current} + V\text{cursor}\, dt + \Sigma \iint (Fi/mi)\, dt\, dt,$$

where Vcursor is the vector with the direction Pphysical−Pdisplayed, and an assigned magnitude (may be fixed, or proportional to Pphysical−Pdisplayed in some examples), mi is the mass (e.g., probability) assigned to the i-th key, and the double integration over time is taken from the instant acceleration to instant velocity, and to the position vector change, as influenced by each particular key.

Returning to FIG. 2, different and/or additional adjustments to the display and/or operation of the keyboard may be provided to facilitate input to the keyboard. For example, as indicated at 218, the method may optionally include receiving user input performing a gesture over a key and/or the keyboard. As indicated at 220, the method may include adjusting key selections and/or the keyboard based on the type of gesture performed. Turning briefly to FIG. 6, examples of gestures that may be performed to provide input are illustrated.

Figure 6A:
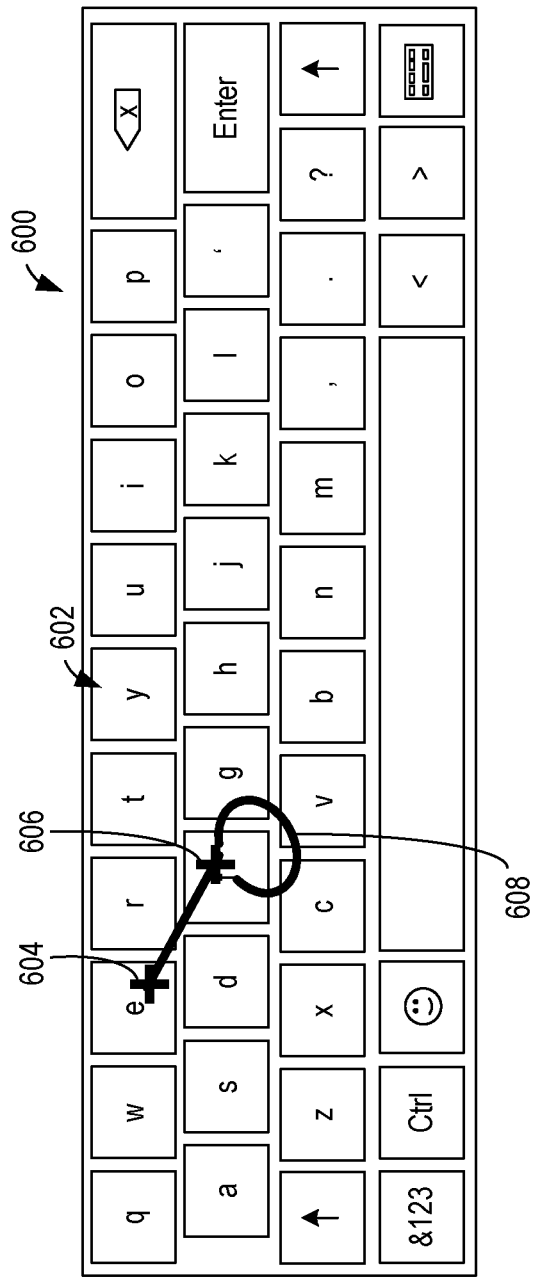
FIGS. 6A and 6B show an example holographic keyboard and representations of input gestures made to the keyboard.

FIG. 6A shows a holographic keyboard 600 including a plurality of holographic keys 602 (in this example, largely comprising alphabetic keys). The "+" marker 604 may indicate a prior input made to the keyboard to select the holographic key associated with the letter "e." For example, the user may intend to input the word "effect." The "+" marker 606 may indicate a prior input made to the keyboard to select the holographic key associated with the letter "f." In order to continue inputting the word "effect," the letter "f" is to be selected again. In order to facilitate this repeat selection, the system may be configured to interpret a gesture indicating a repeat selection of an immediately prior input. In the illustrated example, the gesture may include moving the cursor in a circle 608 around or at least partially within the hitbox of the key to be input again. In other examples, other suitable gestures may be used to cause an input to be repeated.

Figure 6B:
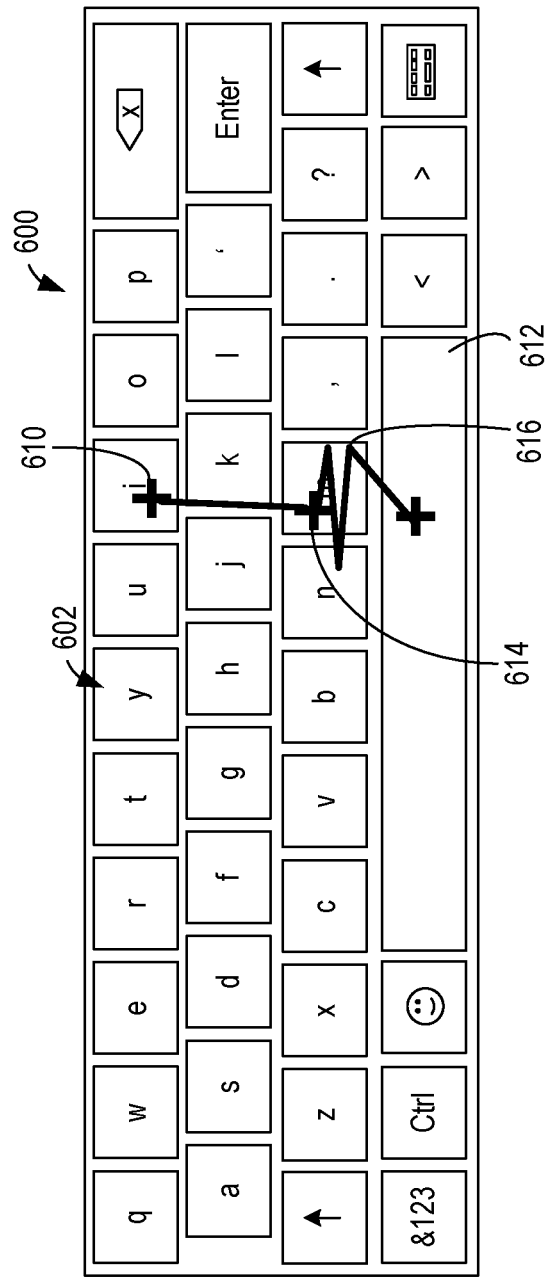

FIG. 6B illustrates an example gesture for deleting an immediately prior input selection to the holographic keyboard 600. The "+" marker 610 may indicate a prior input made to the keyboard to select the holographic key associated with the letter "i." For example, the user may intend to input the phrase "I am." In order to continue inputting this phrase, the user may intend to move the cursor from the "i" key to the space bar 612. However, the user may inadvertently dwell, change direction, or otherwise provide selection input while hovering the cursor over the key associated with the letter "m," as indicated by the "+" marker 614. In order to delete the accidental selection, the user may move the cursor left and right over the key to be deleted (e.g., the "m" key) and stop on that key, as indicated at 616. After performing the delete gesture, the user may continue moving the cursor toward the space bar 612 and provide input thereto. In this way, a user may avoid having to move the cursor out of the way toward a backspace key.

Accordingly, the above-described gestures may be used to facilitate input selection with button-less hardware and/or for scenarios where button selection is unavailable or inconvenient. In such scenarios, mechanisms used for selection may be prone to issues regarding accidental selection or poor support for repeated selection. The above-described gestures may assist a user in addressing these issues by providing mechanisms for quickly repeating selections or deleting/reversing selections.

Figure 7:
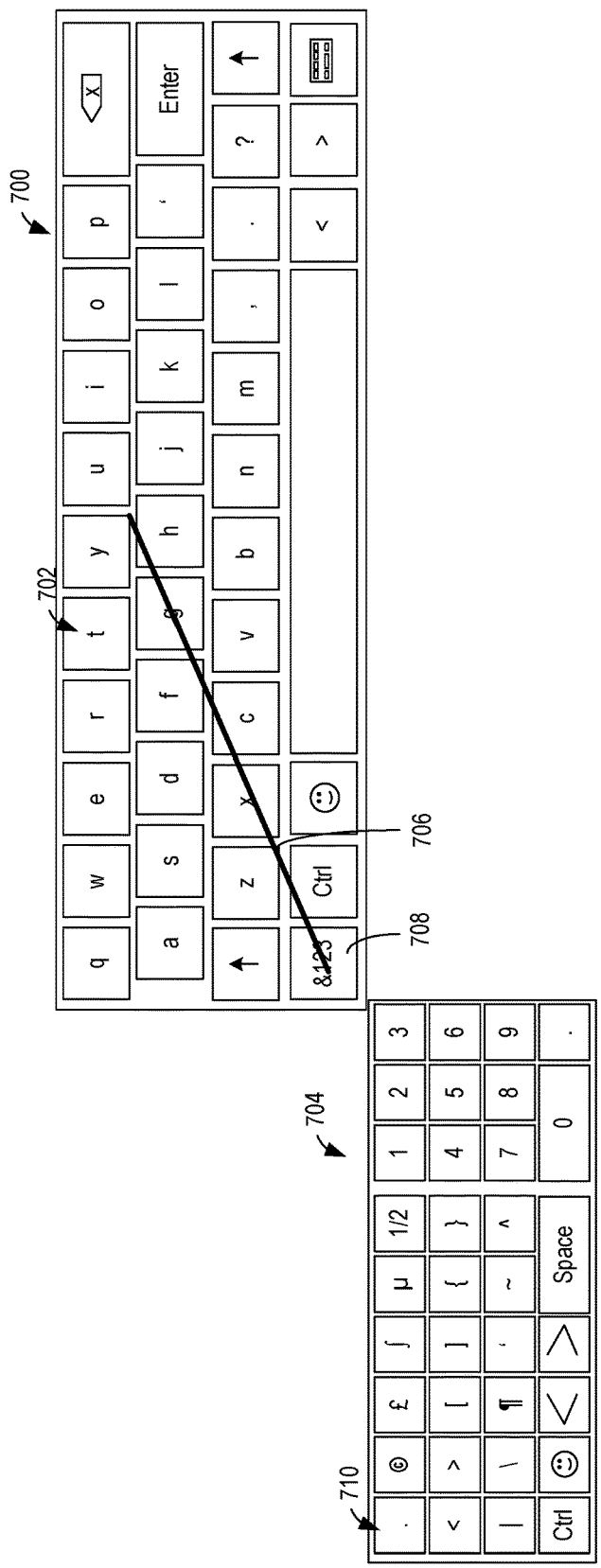
FIG. 7 shows an example first holographic keyboard and an example second holographic keyboard that is presented based at least on a user input gesture made to the keyboard.

Another example of a gesture-based operation is illustrated in FIG. 7. FIG. 7 shows a first holographic keyboard, 700, including a plurality of holographic keys 702. In order to quickly switch to and/or additionally display a second holographic keyboard 704, a gesture including a movement of the cursor to a mode key 706 at a corner of the keyboard 700, as indicated by trajectory 708, may be performed. The second holographic keyboard 704 may include different holographic keys 710 from the holographic keys 702 of the first holographic keyboard. In the illustrated example, the different holographic keys 710 are primarily numeric and symbol keys (e.g., different types of keys from the primarily alphabetic holographic keys 702). The second holographic keyboard 704 may be dismissed (e.g., removed from the display) based on another gesture input (e.g., movement of the cursor toward the first holographic keyboard 700 through the mode key 706) and/or a selection of the mode key (e.g., via one or more of the selection mechanisms described above).

Returning to FIG. 2, the method may optionally include predicting a plurality of words most likely to be input as a continuation of prior input (e.g., based on one or more immediately prior key selections and/or other contextual information), as indicated at 222. As indicated at 224, the method may further include displaying a word cloud near the keyboard including the plurality of predicted words. The prediction of words most likely to be input may be performed by the input prediction logic according to one or more of the machine learning algorithms described above, in some examples.

Figure 8:
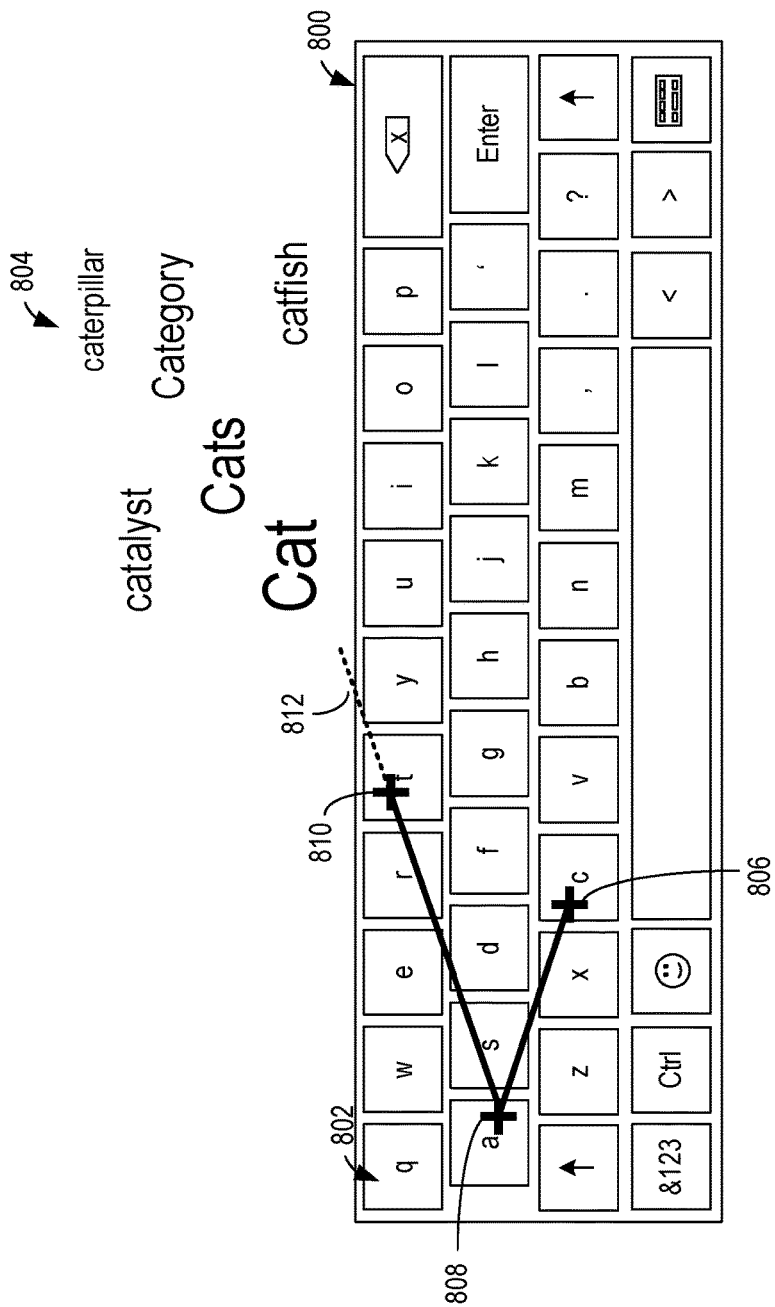
FIG. 8 shows an example holographic keyboard including a word cloud of words predicted to be input based at least on one or more immediately prior holographic key selections.

FIG. 8 shows an example holographic keyboard 800 including a plurality of holographic keys 802. A word cloud 804 may be presented as a part of the holographic keyboard 800 and/or proximate to the holographic keyboard 800. In the illustrated example, the user may select the letters "c," "a," and "t," as shown by the respective "+" markers 806, 808, and 810. A language model or other computer analysis may determine words that are most likely to be input based on the selected letters and/or other contextual information (e.g., the contextual information described above as being used to determine most likely next letters). The word cloud 804 may include a plurality of words that represent the most likely words to be input according to the computer analysis (e.g., a top [x] number of most likely words to be selected, words that have a likelihood to be selected that is above a threshold, etc.). As illustrated, the word cloud may be displayed at a location that is aligned with a trajectory 812 of movement of the cursor after an immediately prior input (e.g., the key associated with the letter "t"). The size and/or position of each of the words in the word cloud may be selected based on the likelihood of that word being selected. For example, a size of the word may increase with increasing likelihood of input and may be based on an absolute likelihood determination or a relative likelihood determination (e.g., relative to the other words in the cloud). Likewise, a position of the word may be more proximate to the cursor relative to other words as the likelihood of that word increases, such that the most likely word to be selected is closest to the cursor and/or the cursor's trajectory.

In this way, autocomplete guesses (e.g., words most likely to be input based at least on computer analysis of prior keyboard inputs) are displayed around the virtual keyboard by positioning the highest confidence guesses near the boundary of the virtual keyboard, and on a vector that is the extension of the current direction of the pointer. Accordingly, the user may be able to connect with the highest confidence selection, with the least amount of cursor redirection/control. Lower confidence guesses may "fan out" from the highest confidence guess at increasing distance and requiring changes of cursor direction. In this way, the computing device may present the predicted words in a location that indicates, to a user, that movement of the pointer outside the borders of the holographic keyboard may confirm selection of a highest confidence guess (e.g., a word selected with the highest confidence by a machine learning algorithm or other computer analysis). For consistency with the "fishbowl effect" feature described above and with respect to FIG. 3, higher confidence guesses may be assigned a larger font and "clickable area" in order to make for more visible, easier to select targets.

In some examples, for location aware devices, location context may be used as an additional input to weigh the potential intended input, in addition to time and language model. For example, if a user tends to wear an HMD on Friday nights in the user's living room and always plays the same game (which title starts with "N"), the first choice offered in that context may be the game—as opposed e.g., to "News", which is what the user may normally look for in the morning in his/her home office.

Accordingly, the methods and systems described herein may increase efficiency of providing text input to a cursor-based holographic keyboard by adjusting the appearance of the keyboard and/or the movement of the cursor based on contextual information, such as prior inputs to the keyboard. Building upon a familiar input paradigm entails a minimal learning curve and allows for immediate user productivity, as opposed to some alternatives that, by steering clear of prevalent design choices (e.g., the QWERTY keyboard layout and its regional variations), impose a potentially unacceptable training and usability tax. The example scenarios of holographic keyboard operability and adjustments described herein may be selectively deployed in some examples (e.g., based on user preference and selection). In this way, the different example scenarios (e.g., as described in FIGS. 3-8) may be used together in any combination or singularly (one at a time). Furthermore, any one or more of the above examples may be used and/or modified based on user preference selection.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
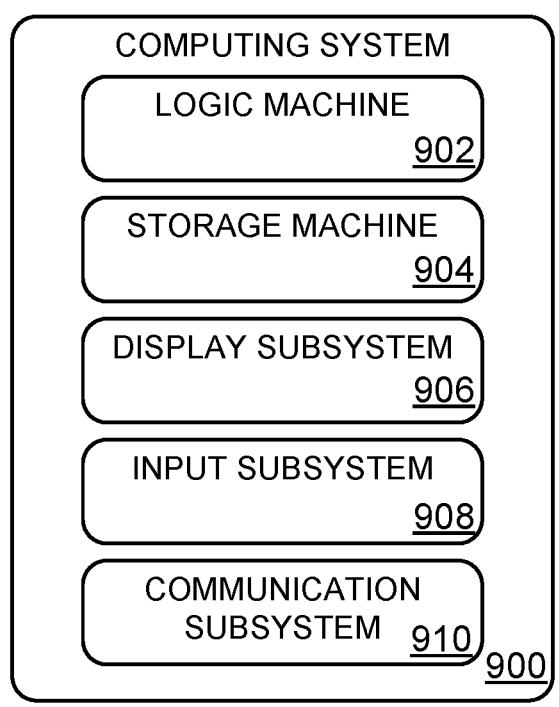
FIG. 9 shows a block diagram of an example computing device.

FIG. 9 schematically shows a non-limiting embodiment of a computing system 900 that can enact one or more of the methods and processes described above. Computing system 900 is shown in simplified form. Computing system 900 may take the form of one or more head-mounted display devices, personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. As an example, the logic machine may include the input prediction logic described above for performing machine learning algorithms to predict a likelihood of selecting a particular key of a holographic keyboard and/or a particular word of a language model.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by storage machine 904. This visual representation may take the form of a graphical user interface (GUI), such as a holographic keyboard, examples of which are illustrated in FIGS. 1B and 3-8. As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices. For example, the display subsystem 906 may include a see-through near-eye display of an HMD device, such as HMD device 108 of FIG. 1A. In other examples, the display subsystem may include a display of a mobile device, a monitor of a desktop computer, etc.

When included, input subsystem 908 may comprise or interface with one or more user-input devices such as a keyboard, mouse, touch screen, or game controller (e.g., controller 110 of FIG. 1A). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, the input subsystem 908 may be used to control movement of a cursor over a holographic keyboard and to select one or more holographic keys of the holographic keyboard or otherwise provide input to the holographic keyboard.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Figure 10:
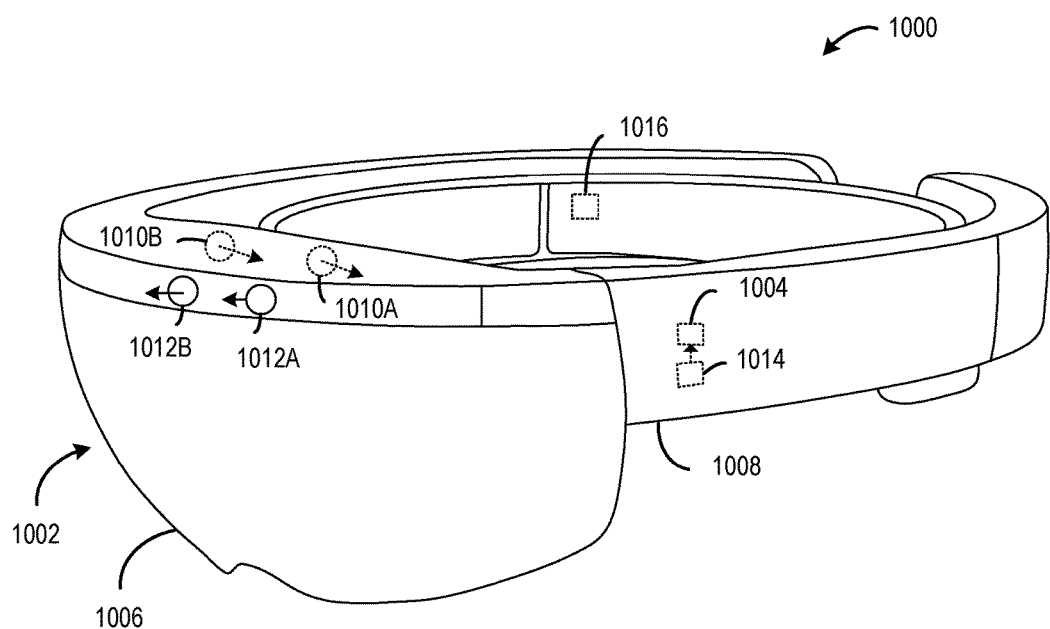
FIG. 10 schematically shows an example virtual-reality computing system.

FIG. 10 shows aspects of an example virtual-reality computing system 1000 including a near-eye display 1002. The virtual-reality computing system 1000 is a non-limiting example of the computing devices described above (e.g., HMD 108 of FIG. 1A), and may be usable for displaying and modifying digital images according to a user's photoreceptor distribution. Virtual reality computing system 1000 may be implemented as computing system 900 shown in FIG. 9.

The virtual-reality computing system 1000 may be configured to present any suitable type of virtual-reality experience. In some implementations, the virtual-reality experience includes a totally virtual experience in which the near-eye display 1002 is opaque, such that the wearer is completely absorbed in the virtual-reality imagery provided via the near-eye display 1002.

In some implementations, the virtual-reality experience includes an augmented-reality experience in which the near-eye display 1002 is wholly or partially transparent from the perspective of the wearer, to give the wearer a clear view of a surrounding physical space. In such a configuration, the near-eye display 1002 is configured to direct display light to the user's eye(s) so that the user may see augmented-reality objects that are not actually present in the physical space. In other words, the near-eye display 1002 may direct display light to the user's eye(s) while light from the physical space passes through the near-eye display 1002 to the user's eye(s). As such, the user's eye(s) simultaneously receive light from the physical environment and display light.

In such augmented-reality implementations, the virtual-reality computing system 1000 may be configured to visually present augmented-reality objects that appear body-locked and/or world-locked. A body-locked augmented-reality object may appear to move along with a perspective of the user as a pose (e.g., six degrees of freedom (DOF): x, y, z, yaw, pitch, roll) of the virtual-reality computing system 1000 changes. As such, a body-locked, augmented-reality object may appear to occupy the same portion of the near-eye display 1002 and may appear to be at the same distance from the user, even as the user moves in the physical space. Alternatively, a world-locked, augmented-reality object may appear to remain in a fixed location in the physical space, even as the pose of the virtual-reality computing system 1000 changes. When the virtual-reality computing system 1000 visually presents world-locked, augmented-reality objects, such a virtual-reality experience may be referred to as a mixed-reality experience.

In some implementations, the opacity of the near-eye display 1002 is controllable dynamically via a dimming filter. A substantially see-through display, accordingly, may be switched to full opacity for a fully immersive virtual-reality experience.

The virtual-reality computing system 1000 may take any other suitable form in which a transparent, semi-transparent, and/or non-transparent display is supported in front of a viewer's eye(s). Further, implementations described herein may be used with any other suitable computing device, including but not limited to wearable computing devices, mobile computing devices, laptop computers, desktop computers, smart phones, tablet computers, etc.

Any suitable mechanism may be used to display images via the near-eye display 1002. For example, the near-eye display 1002 may include image-producing elements located within lenses 1006. As another example, the near-eye display 1002 may include a display device, such as a liquid crystal on silicon (LCOS) device or OLED microdisplay located within a frame 1008. In this example, the lenses 1006 may serve as, or otherwise include, a light guide for delivering light from the display device to the eyes of a wearer. Additionally or alternatively, the near-eye display 1002 may present left-eye and right-eye virtual-reality images via respective left-eye and right-eye displays.

The virtual-reality computing system 1000 includes an on-board computer 1004 configured to perform various operations related to receiving user input (e.g., gesture recognition, eye gaze detection), visual presentation of virtual-reality images on the near-eye display 1002 (e.g. the holographic keyboards illustrated in FIGS. 1B and 3-8), and other operations described herein. In some implementations, some to all of the computing functions described above, may be performed off board.

The virtual-reality computing system 1000 may include various sensors and related systems to provide information to the on-board computer 1004. Such sensors may include, but are not limited to, one or more inward facing image sensors 1010A and 1010B, one or more outward facing image sensors 1012A and 1012B, an inertial measurement unit (IMU) 1014, and one or more microphones 1016. The one or more inward facing image sensors 1010A, 1010B may be configured to acquire gaze tracking information from a wearer's eyes (e.g., sensor 1010A may acquire image data for one of the wearer's eye and sensor 1010B may acquire image data for the other of the wearer's eye).

The on-board computer 1004 may be configured to determine gaze directions of each of a wearer's eyes in any suitable manner based on the information received from the image sensors 1010A, 1010B. The one or more inward facing image sensors 1010A, 1010B, and the on-board computer 1004 may collectively represent a gaze detection machine configured to determine a wearer's gaze target on the near-eye display 1002. In other implementations, a different type of gaze detector/sensor may be employed to measure one or more gaze parameters of the user's eyes. Examples of gaze parameters measured by one or more gaze sensors that may be used by the on-board computer 1004 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 1012A, 1012B may be configured to measure physical environment attributes of a physical space. In one example, image sensor 1012A may include a visible-light camera configured to collect a visible-light image of a physical space. Further, the image sensor 1012B may include a depth camera configured to collect a depth image of a physical space. More particularly, in one example, the depth camera is an infrared time-of-flight depth camera. In another example, the depth camera is an infrared structured light depth camera.

Data from the outward facing image sensors 1012A, 1012B may be used by the on-board computer 1004 to detect movements, such as gesture-based inputs or other movements performed by a wearer or by a person or physical object in the physical space. In one example, data from the outward facing image sensors 1012A, 1012B may be used to detect a wearer input performed by the wearer of the virtual-reality computing system 1000, such as a gesture. Data from the outward facing image sensors 1012A, 1012B may be used by the on-board computer 1004 to determine direction/location and orientation data (e.g., from imaging environmental features) that enables position/motion tracking of the virtual-reality computing system 1000 in the real-world environment. In some implementations, data from the outward facing image sensors 1012A, 1012B may be used by the on-board computer 1004 to construct still images and/or video images of the surrounding environment from the perspective of the virtual-reality computing system 1000.

The IMU 1014 may be configured to provide position and/or orientation data of the virtual-reality computing system 1000 to the on-board computer 1004. In one implementation, the IMU 1014 may be configured as a three-axis or three-degree of freedom (3 DOF) position sensor system. This example position sensor system may, for example, include three gyroscopes to indicate or measure a change in orientation of the virtual-reality computing system 1000 within 3D space about three orthogonal axes (e.g., roll, pitch, and yaw).

In another example, the IMU 1014 may be configured as a six-axis or six-degree of freedom (6 DOF) position sensor system. Such a configuration may include three accelerometers and three gyroscopes to indicate or measure a change in location of the virtual-reality computing system 1000 along three orthogonal spatial axes (e.g., x, y, and z) and a change in device orientation about three orthogonal rotation axes (e.g., yaw, pitch, and roll). In some implementations, position and orientation data from the outward facing image sensors 1012A, 1012B and the IMU 1014 may be used in conjunction to determine a position and orientation (or 6 DOF pose) of the virtual-reality computing system 1000.

The virtual-reality computing system 1000 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 1016 may be configured to measure sound in the physical space. Data from the one or more microphones 1016 may be used by the on-board computer 1004 to recognize voice commands provided by the wearer to control the virtual-reality computing system 1000.

The on-board computer 1004 may include a logic machine and a storage machine, discussed in more detail above with respect to FIG. 9, in communication with the near-eye display 1002 and the various sensors of the virtual-reality computing system 1000.

Another example provides for a computing device including a display configured to visually present a holographic cursor and a holographic keyboard including a plurality of holographic keys, an input interface configured to receive, from an input device, user input controlling the holographic cursor, and input predictor logic configured to, based at least on one or more immediately prior selections of holographic keys, predict a subset of holographic keys most likely to be selected next, and adjust one or both of an appearance of the holographic keyboard and a parameter of movement of the holographic cursor to facilitate selection of a holographic key in the predicted subset of holographic keys. In such an example, the display may additionally or alternatively include a see-through near-eye display. In such an example, the input device may additionally or alternatively include an eye tracking imaging device. In such an example, the input device may additionally or alternatively include one or both of a peripheral handheld controller and a touch-sensitive device. In such an example, the selection of the holographic key may additionally or alternatively be facilitated by increasing a size of one or more of the holographic keys in the predicted subset of holographic keys. In such an example, the selection of the holographic key may additionally or alternatively be facilitated by adjusting a speed of movement of the holographic cursor based at least on a distance of the holographic cursor from one of the holographic keys in the predicted subset of holographic keys. In such an example, the computing device may additionally or alternatively further include stopping movement of the holographic cursor for a threshold period of time based at least on the user input causing the cursor to move to a location that is within a threshold distance of one of the holographic keys in the predicted subset of holographic keys. In such an example, the selection of the holographic key may additionally or alternatively be facilitated by adjusting a direction of movement of the holographic cursor based at least on a distance of the holographic cursor from one of the holographic keys in the predicted subset of holographic keys. In such an example, the input predictor logic may additionally or alternatively be further configured to, based at least on the one or more immediately prior selections of holographic keys, predict a plurality of words most likely to be input as a continuation of the one or more immediately prior selections of holographic keys. In such an example, adjusting the appearance of the holographic keyboard may additionally or alternatively include displaying the plurality of words as selectable word objects, the size and position of each of the plurality of selectable word objects being adjusted to facilitate selection of a selectable word object corresponding to a word that is determined to be most likely to be input based at least on one or more immediately prior selections of holographic keys. In such an example, the holographic keyboard may additionally or alternatively be world locked. In such an example, the holographic keyboard may additionally or alternatively be body locked. In such an example, the input predictor logic may additionally or alternatively be further configured to delete one or more immediately prior selections of holographic keys based at least on user input controlling the holographic cursor to perform a first gesture relative to a holographic key, and repeat an immediately prior selection of a holographic key based at least on user input controlling the holographic cursor to perform a second gesture relative to the holographic key. In such an example, the holographic keyboard may additionally or alternatively be a first holographic keyboard, and the input predictor logic may additionally or alternatively be further configured to display a second holographic keyboard with different holographic keys based on user input controlling the holographic cursor to perform a gesture relative to the holographic keyboard. Any or all of the above-described examples may be combined in any suitable manner in various implementations.

Another example provides for a method for facilitating user selection of holographic keys, the method including displaying, via a display of a head-mounted display (HMD) device, a holographic cursor and a holographic keyboard, the holographic keyboard including a plurality of holographic keys, based at least on one or more immediately prior selections of holographic keys, predicting a subset of holographic keys most likely to be selected next, and adjusting one or both of an appearance of the holographic keyboard and a parameter of movement of the holographic cursor to facilitate selection of a holographic key in the predicted subset of holographic keys. In such an example, the selection of the holographic key may additionally or alternatively be facilitated by increasing a size of one or more of the holographic keys in the predicted subset of holographic keys. In such an example, the selection of the holographic key may additionally or alternatively be facilitated by adjusting one or both of a speed and a direction of movement of the holographic cursor responsive to the user input based at least on a distance of the holographic cursor from one of the holographic keys in the predicted subset of holographic keys. In such an example, the method may additionally or alternatively further include, based at least on the one or more immediately prior selections of holographic keys, predicting a plurality of words most likely to be input as a continuation of the one or more immediately prior selections of holographic keys, wherein adjusting the appearance of the holographic keyboard comprises displaying the plurality of words as selectable word objects, the size and position of each of the plurality of selectable word objects being adjusted to facilitate selection of a selectable word object corresponding to a word determined to be most likely to be input based at least on one or more immediately prior selections of holographic keys. Any or all of the above-described examples may be combined in any suitable manner in various implementations.

Another example provides for a method for presenting a holographic keyboard, the method including displaying, via a display of a head-mounted display (HMD) device, a holographic cursor and the holographic keyboard, the holographic keyboard including a plurality of holographic keys, based at least on one or more immediately prior selections of holographic keys, predicting a plurality of words most likely to be input next as a continuation of the one or more immediately prior selections of holographic keys, and displaying a word cloud proximate to the holographic keyboard, the word cloud including a plurality of selectable word objects each corresponding to an associated word of the plurality of words to facilitate selection of a selectable word object in the word cloud. In such an example, the selection of the selectable word object in the word cloud may additionally or alternatively be facilitated by positioning the word cloud in a location that is aligned with a trajectory of movement of the holographic cursor, and a selectable word object corresponding to a word that is determined to be most likely to be input may additionally or alternatively be positioned closest to the holographic cursor along the trajectory of movement. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
    a display configured to visually present a holographic cursor and a holographic keyboard including a plurality of holographic keys;
    an input interface configured to receive, from an input device, user input controlling the holographic cursor; and
    input predictor logic configured to:
        based on one or more prior selections of holographic keys, predict a subset of holographic keys most likely to be selected next, and
        adjust a speed and/or direction of user-directed movement of the holographic cursor to facilitate selection of a holographic key in the predicted subset of holographic keys.

2. The computing device of claim 1, wherein the display includes a see-through near-eye display.

3. The computing device of claim 1, wherein the input device includes an eye tracking imaging device.

4. The computing device of claim 1, wherein the input device includes one or both of a peripheral handheld controller and a touch-sensitive device.

5. The computing device of claim 1, wherein the selection of the holographic key is facilitated by increasing a size of one or more of the holographic keys in the predicted subset of holographic keys.

6. The computing device of claim 1, wherein the selection of the holographic key is facilitated by adjusting a speed of movement of the holographic cursor, and wherein the speed of movement is adjusted based on a distance of the holographic cursor from one of the holographic keys in the predicted subset of holographic keys.

7. The computing device of claim 6, further comprising, stopping movement of the holographic cursor for a threshold period of time based at least on the user input causing the cursor to move to a location that is within a threshold distance of one of the holographic keys in the predicted subset of holographic keys.

8. The computing device of claim 1, wherein the selection of the holographic key is facilitated by adjusting a direction of movement of the holographic cursor based at least on a distance of the holographic cursor from one of the holographic keys in the predicted subset of holographic keys.

9. The computing device of claim 1, wherein the input predictor logic is further configured to, based on the one or more prior selections of holographic keys, predict a plurality of words most likely to be input as a continuation of the one or more immediately prior selections of holographic keys.

10. The computing device of claim 9, further comprising adjusting an appearance of the holographic keyboard, including displaying the plurality of words as selectable word objects, the size and position of each of the plurality of selectable word objects being adjusted to facilitate selection of a selectable word object corresponding to a word that is determined to be most likely to be input based at least on one or more prior selections of holographic keys.

11. The computing device of claim 1, wherein the holographic keyboard is world locked.

12. The computing device of claim 1, wherein the holographic keyboard is body locked.

13. The computing device of claim 1, wherein the input predictor logic is further configured to:
- delete one or more immediately prior selections of holographic keys based at least on user input controlling the holographic cursor to perform a first gesture relative to a holographic key, and
- repeat an immediately prior selection of a holographic key based at least on user input controlling the holographic cursor to perform a second gesture relative to the holographic key.

14. The computing device of claim 1, wherein the holographic keyboard is a first holographic keyboard, and wherein the input predictor logic is further configured to display a second holographic keyboard with different holographic keys based on user input controlling the holographic cursor to perform a gesture relative to the holographic keyboard.

15. A method for facilitating user selection of holographic keys, the method comprising:
- displaying, via a display of a head-mounted display (HMD) device, a holographic cursor and a holographic keyboard including a plurality of holographic keys;
- based on one or more immediately prior selections of holographic keys, predicting a subset of holographic keys most likely to be selected next; and
- adjusting one or both of a speed and a direction of movement of the holographic cursor responsive to user input based on a distance of the holographic cursor from one of the holographic keys in the predicted subset of holographic keys, to facilitate selection of a holographic key in the predicted subset of holographic keys.

16. The method of claim 15, wherein the selection of the holographic key is facilitated by increasing a size of one or more of the holographic keys in the predicted subset of holographic keys.

17. The method of claim 15, further comprising, based at least on the one or more immediately prior selections of holographic keys, predicting a plurality of words most likely to be input as a continuation of the one or more immediately prior selections of holographic keys and adjusting an appearance of the holographic keyboard, including displaying the plurality of words as selectable word objects, the size and position of each of the plurality of selectable word objects being adjusted to facilitate selection of a selectable word object corresponding to a word determined to be most likely to be input based at least on one or more immediately prior selections of holographic keys.

18. A method for presenting a holographic keyboard, the method comprising:
- displaying, via a display of a head-mounted display (HMD) device, a holographic cursor and the holographic keyboard, the holographic keyboard including a plurality of holographic keys;
- based on one or more immediately prior selections of holographic keys, predicting a plurality of words most likely to be input next as a continuation of the one or more immediately prior selections of holographic keys; and
- displaying a word cloud proximate to the holographic keyboard, the word cloud including a plurality of selectable word objects each corresponding to an associated word of the plurality of words, to facilitate selection of a selectable word object in the word cloud,
- wherein the selection of the selectable word object in the word cloud is facilitated by positioning the word cloud in a location that is aligned with a trajectory of movement of the holographic cursor, a selectable word object corresponding to a word that is determined to be most likely to be input being positioned closest to the holographic cursor along the trajectory of movement.

* * * * *